United States Patent
Lindskog et al.

(10) Patent No.: US 12,333,055 B2
(45) Date of Patent: Jun. 17, 2025

(54) SECURITY COMPONENT AND METHOD OF OPERATION

(71) Applicant: Telefonaktiebolaget LM Ericsson (publ), Stockholm (SE)

(72) Inventors: Niklas Lindskog, Lund (SE); Håkan Englund, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 235 days.

(21) Appl. No.: 18/012,910

(22) PCT Filed: Jun. 26, 2020

(86) PCT No.: PCT/EP2020/068145
§ 371 (c)(1),
(2) Date: Dec. 23, 2022

(87) PCT Pub. No.: WO2021/259501
PCT Pub. Date: Dec. 30, 2021

(65) Prior Publication Data
US 2023/0351057 A1    Nov. 2, 2023

(51) Int. Cl.
*G06F 21/73* (2013.01)
*G06F 21/57* (2013.01)

(52) U.S. Cl.
CPC ............ *G06F 21/73* (2013.01); *G06F 21/575* (2013.01); *G06F 2221/034* (2013.01)

(58) Field of Classification Search
CPC ... G06F 21/73; G06F 21/575; G06F 2221/034
(Continued)

(56) References Cited

U.S. PATENT DOCUMENTS

| 8,928,347 B2 | 1/2015 | Gotze et al. |
| 10,263,793 B2 | 4/2019 | Rezayee et al. |

(Continued)

FOREIGN PATENT DOCUMENTS

CN    109388111 A    2/2019

OTHER PUBLICATIONS

Konigsmark, S. T. Choden, et al., "PolyPUF: Physically Secure Self-Divergence", IEEE Transactions on Computer-Aided Design of Integrated Circuits and Systems, 2015, 1-14.
(Continued)

*Primary Examiner* — Michael S McNally
(74) *Attorney, Agent, or Firm* — Murphy, Bilak & Homiller, PLLC

(57) ABSTRACT

A security component (102, 202) for a device (200) is disclosed. The security component (102) comprises a Physically Unclonable Function (PUF) (150) having a plurality of sub functions (152), and a management module (110) that is configured to manage the PUF (150) in accordance with a policy. The management module (110) comprises a measurement module (112) configured to receive, from a device boot process, at least one of a measurement of a component on the device or a measurement of a hardware state of the device, and a rule module (114) configured to compare the received measurement to at least one rule that implements the policy, and to enter a policy state on the basis of the comparison. The management module further comprises a control module (116) configured to configure the PUF (150) in accordance with a policy state entered by the rule module. Also disclosed is a method (300) for operating a security component.

26 Claims, 14 Drawing Sheets

(58) Field of Classification Search
USPC .............................................................. 726/1
See application file for complete search history.

(56) References Cited

U.S. PATENT DOCUMENTS

| | | |
|---|---|---|
| 2010/0031065 A1 | 2/2010 | Futa et al. |
| 2012/0183135 A1 | 7/2012 | Paral et al. |
| 2016/0328571 A1 | 11/2016 | Duplys et al. |
| 2017/0132434 A1* | 5/2017 | Wang .................... H04L 9/3278 |
| 2017/0149572 A1 | 5/2017 | Wallrabenstein |
| 2019/0026724 A1 | 1/2019 | Wade et al. |
| 2019/0140851 A1* | 5/2019 | Ma ........................ H04L 9/3278 |

OTHER PUBLICATIONS

Li, Zhiwen, "Physical Unclonable Hardware (PUF) Security Technology for FPGAs", A Master Thesis Submitted to University of Electronic Science and Technology China, 2018, 1-74.

* cited by examiner

SECURITY COMPONENT AND METHOD OF OPERATION

PRIORITY CLAIM

This application is a national stage application of International Patent Application No. PCT/EP2020/068145, filed Jun. 26, 2020, the disclosure disclosures of which is hereby incorporated in its entirety by reference.

TECHNICAL FIELD

The present disclosure relates to a security component for a device and to a method for operating a security component for a device. The present disclosure also relates to a computer program and a computer program product configured, when run on a computer to carry out methods for operating a security component for a device.

BACKGROUND

Physically Unclonable Functions (PUFs) may be used as part of a security apparatus for an electronic device, which may for example be a device operable to communicate over wired or wireless technology, and may be operable to connect to a communication network. PUFs are used to create a unique response by exploiting implicit or explicit randomness in their physical structure. Implicit randomness refers to unpredictable manufacturing differences in semiconductor devices, which differences can be exploited to create a device-unique response. Explicit randomness refers to differences that are not an inherent consequence of manufacturing but are deliberately introduced at a later stage. A PUF response can be used for cryptographic or device identity purposes. For example, a PUF response may be used to create a unique device identity or a device unique key, without having to store the key in, for example, Battery Backed Random Access Memory (BBRAM) or One Time Pad (OTP) memory.

A PUF may consist of one or several elements or components, referred to in the present disclosure as sub functions. Each sub function contributes a part of the PUF response. Examples of sub functions may include:

- Ring-oscillators: an uneven number of signal inverters in a ring which uses gate delay propagation as a source of randomness. The PUF response is a comparison between two or more ring-oscillators where the number of oscillations at a given point is measured. The response can e.g. be the identifier of the fastest/slowest ring oscillator.
- Uninitialized Static Random Access Memory (SRAM) cells, which have two possible states (0 and 1). Prior to power up, the cell is in neither state. At power up, the cell stabilizes in one of the two states. The response is the entered state.

Each sub function also has the property that it is physically unclonable, i.e. unique for the device. A PUF may therefore comprise several sub functions which can be used as independent PUFs, albeit with fewer possible challenges and fewer response bits.

Many different types of PUF exist, and the different types may be categorized according to performance, physical structure etc. Challenge-response type PUFs require input to trigger the PUF response. Challenge-response types PUFs include static PUFs, which support only a single challenge to which they return a response, and PUFs supporting multiple challenge-response mappings. Most PUF types additionally require user data in order to function properly; for example a PUF may need helper data in order to increase the probability of recreating exactly the same response given the same challenge. As a PUF response is usually sensitive and should be kept secret, devices incorporating a PUF are usually required to have firmware and/or hardware protecting the PUF.

A PUF is not client-aware, and is therefore unable to protect any secrets if accessed by an unauthorised party. A PUF and its responses are therefore required to be protected by the device on which the PUF is installed. If the device is compromised, any secrets protected by the PUF will consequently also be compromised. This raises particular challenges if the PUF response or any derivate thereof are to be protected from a party having physical access to the device. Challenge-response type of PUFs can deterministically generate multiple responses. Anyone with access to the PUF has the possibility to generate any challenge-response pair. In order to guarantee that a specific response is not available to particular user, the corresponding challenge must be kept secret, thus removing part of the advantage of using the PUF, namely the absence of secrets stored in OTP or BBRAM.

U.S. Pat. No. 10,263,793 discloses the possibility of modifying a PUF response as a consequence of a "tamper event". This may temporarily disable the PUF in order to prevent the PUF from providing its response, and so disclosing associated keys or identity, while the tamper event is investigated. In other examples, the modification may be a permanent change, essentially destroying the PUF as installed by permanently modifying its structure, and consequently its response to a challenge.

SUMMARY

It is an aim of the present disclosure to provide a security component, method of operating a security component, and a computer readable medium which cooperate to provide a security component response which is dependent upon components booted on the device and in accordance with a policy.

According to a first aspect of the present disclosure, there is provided a security component for a device, the security component comprising a Physically Unclonable Function (PUF) having a plurality of sub functions, and a management module that is configured to manage the PUF in accordance with a policy. The management module comprises a measurement module configured to receive, from a device boot process, at least one of a measurement of a component on the device, or a measurement of a hardware state of the device; and a rule module configured to compare the received measurement to at least one rule that implements the policy and to enter a policy state on the basis of the comparison. The management module further comprises a control module configured to configure the PUF in accordance with a policy state entered by the rule module.

According to another aspect of the present disclosure, there is provided a method for operating a security component for a device, the security component comprising a PUF having a plurality of sub functions, and a management module that is configured to manage the PUF in accordance with a policy. The method comprises receiving, from a device boot process, at least one of a measurement of a component on the device, or a measurement of a hardware state of the device, and comparing the received measurements to at least one rule that implements the policy. The method further comprises entering a policy state on the basis of the comparison, and configuring the PUF in accordance with the entered policy state.

According to another aspect of the present disclosure, there is provided a computer program product comprising a computer readable medium, the computer readable medium having computer readable code embodied therein, the computer readable code being configured such that, on execution by a suitable computer or processor, the computer or processor is caused to perform a method according to any of the aspects or examples disclosed herein.

Aspects of the present disclosure thus provide a security component comprising a PUF, which component is effectively "aware" of the environment in which it is operating. That is, the security component is operable to modify its behaviour according to components booted on its device and a policy. The management module of the security component evaluates the environment in which it operates by comparing measurements (such as hash values) of booted components or of the hardware state to a predefined policy. The policy determines which state the management module should enter on the basis of received measurements, and so how the PUF should be configured. According to some examples of the present disclosure, each state that may be entered by the management module enforces the PUF to use certain sub functions, and so generate a response that is not only unique to the device but also unique to the current device environment. According to further examples of the present disclosure, once a state has been entered, PUF sub functions not used by the current state may be disabled, so offering an additional layer of security against malicious attempts to generate responses belonging to other states.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Examples of the present disclosure provide a security component for a device and a method of operation that implement a finite number of states, each state being associated with a particular PUF configuration, and consequently a particular PUF response. Each state requires a specific combination of measurements of components booted on the device, and/or measurements of a hardware state of the device, in order for the state to be entered. The states, including the measurements required for each state to be entered, are determined by a policy. The state that is entered by the security component is thus dependent on the measurements of components booted on the device, and/or the hardware state of the device, but is not necessarily a direct consequence of these measurements. The policy specifies valid measurement combinations for the entering of each possible state. Some states may only be accessible via other states, such that different responses may be chained, one or more responses only being accessible once an initial response has been provided. The configuration of such sub-states is determined by the policy. For the avoidance of doubt, the hardware state of the device refers to the current hardware status and/or configuration of the device. The state associated with the security component, abbreviated as "state", refers to the current status and/or configuration of the security component.

The policy may be designed to protect access to the PUF, for example only allowing access to certain states, and consequently certain PUF responses, when a specific configuration of components have been booted on the device. A user booting the device can therefore only access PUF responses, and derivatives thereof, that are consistent with the booted device components and a user-specific device setup. Access to PUF responses for a particular device environment can be adjusted through appropriate policy design and modification. Rules implementing the policy can be configured on the security component using signed bitstreams or other configuration information created off-chip, prior to usage.

In the event that a measurement is provided which does not correspond to any state in the policy, or is otherwise incompatible with the policy, the security component may enter a fallback state, which may for example render the PUF static, providing only a response that is accessible for all users, or disabling the PUF altogether. According to some examples, as states in the policy become inaccessible in light of measurements already received, PUF sub functions that are only used in configurations associated with such inaccessible states may be disabled, so physically prohibiting the PUF from outputting a response belonging to an inaccessible state.

Figure 1:
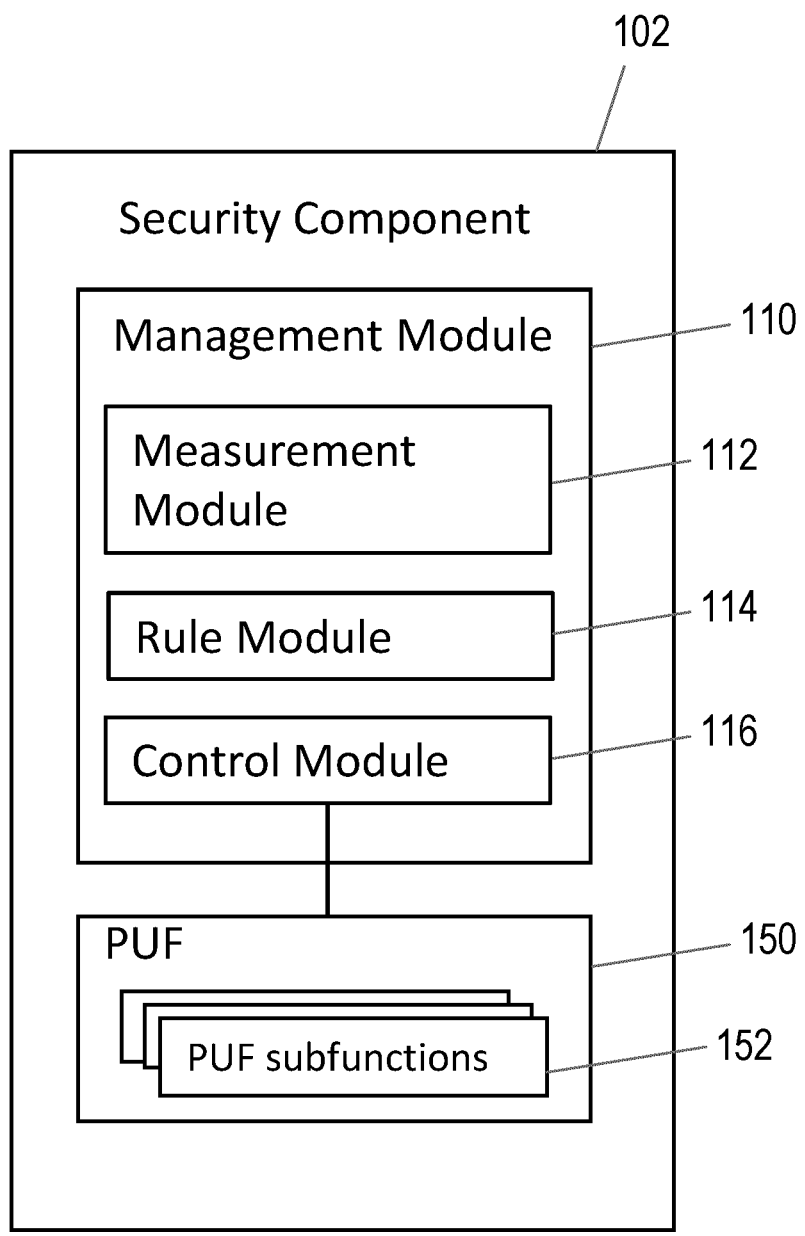
FIG. 1 is a block diagram illustrating a first example of a security component for a device.

FIG. 1 is a block diagram illustrating a first example of a security component 102 for a device according to the present disclosure. The device may comprise an electronic device, which may for example be device operable to communicate over wired or wireless technology, and may be operable to connect to a communication network. The device may for example comprise a UE. Referring to FIG. 1, the security component 102 comprises a Physically Unclonable Function (PUF) 150 having a plurality of sub functions 152. For the purposes of the present disclosure, a PUF sub function comprises a component of the PUF that generates a part, for example one bit, of the PUF response. A PUF sub function may therefore be referred to as a PUF element or PUF component, and may be embodied by a pair of ring oscillators, an SRAM memory cell, an arbiter, transistor components, etc. The security component further comprises a management module 110 that is configured to manage the PUF 150 in accordance with a policy. The management module comprises a measurement module 112 configured to receive, from a device boot process, at least one of a measurement of a component booted on the device or a measurement of a hardware state of the device, including temperature, tamper detection, etc. The measurement module may for example comprise a plurality of measurement registers. The management module 110 further comprises a rule module 114 configured to compare the received measurement to at least one rule that implements the policy, and to enter a policy state on the basis of the comparison. The management module 110 further comprises a control module 116 configured to configure the PUF in accordance with a policy state entered by the rule module.

The security component 102 thus uses a policy to determine how its PUF should be configured, the policy determining PUF configuration on the basis of the environment of the device on which the PUF is installed, that is on the basis of the components booted on the device and/or a hardware state of the device. The components booted on the device may be software components or bitstreams and measurements may comprise a function of the component booted or hardware state, for example a cryptographic function of the component or state, such as a hash function. Configuring the PUF by the control module may comprise activating one or more sub functions of the PUF, selecting which sub functions to use, for example by submitting a challenge to the PUF, configuring the behaviour of sub functions or remapping challenge-response mappings using a Logically Reconfigurable PUF (LR-PUF).

The PUF 150 may comprise any type of PUF. It will be appreciated that in order to implement a given policy, at least one of the following conditions should be met by the PUF:

The PUF comprises a suitable number of sub functions such that the number of available challenges for the PUF is at least equal to the number of states defined in the policy The PUF comprises a LR-PUF.

Figure 2:
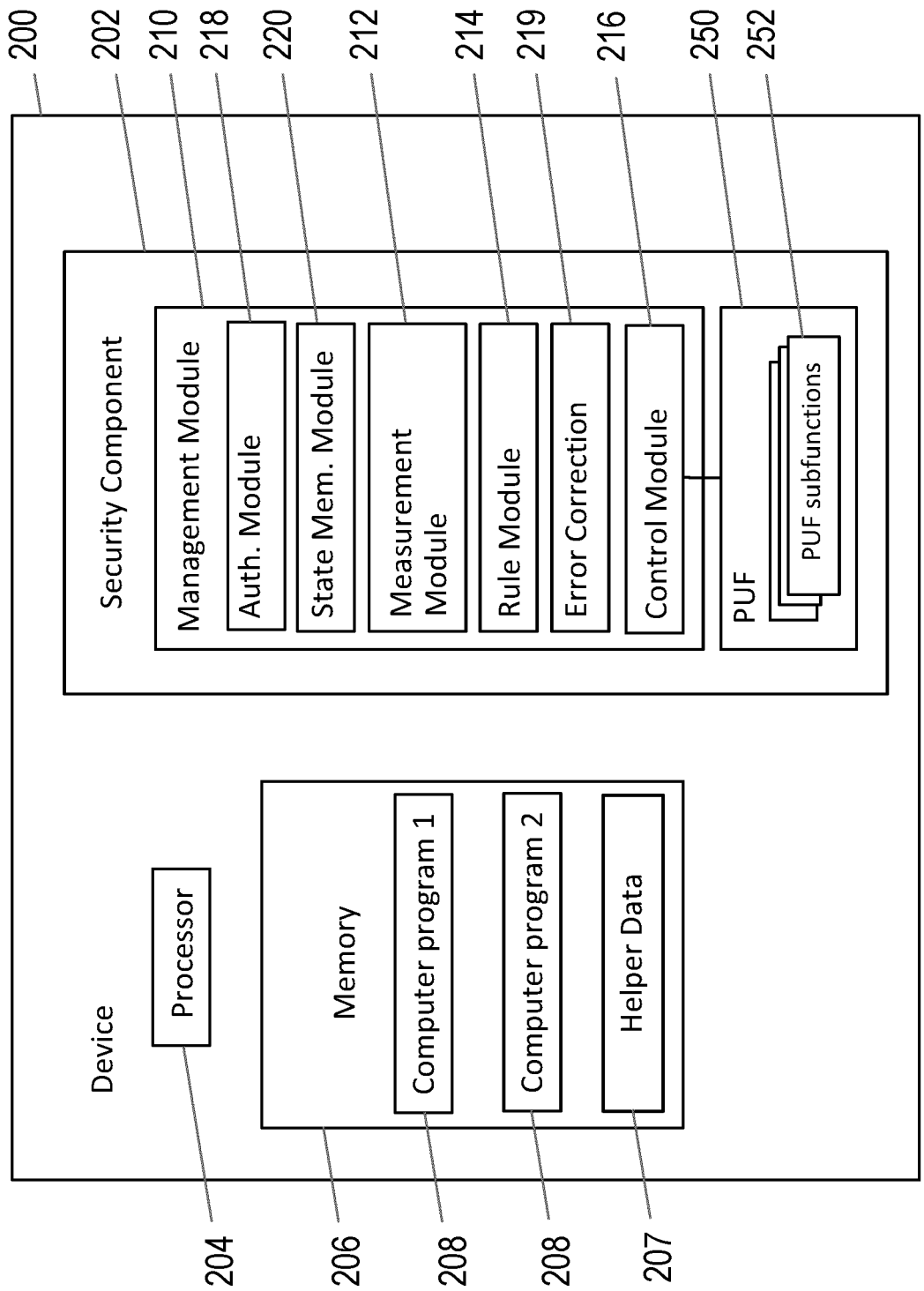
FIG. 2 is a block diagram illustrating another example of security component and a device on which the security component is installed.

FIG. 2 is a block diagram illustrating another example of security component 202, and a device 200 on which the security component is installed. The security component 202 of FIG. 2 illustrates various options for how the management module 110 of the security component 102 may be realised.

Referring to FIG. 2, the device 200 on which the security component 202 is installed comprises a processor 204 and memory 206, on which one or more computer programs 208 may be stored. Items of "Helper Data" 207, including for example error correcting codes, may also be stored in the memory 206, according to different examples of the present disclosure. The device 200 may additionally comprise one or more telecommunications interfaces, for wired or wireless communication. The security component 202 comprises a PUF 250 having a plurality of sub functions 252. The security component 202 further comprises a management module 210 that is configured to manage the PUF 250 in accordance with a policy. As for the security component 102, the management module 210 of the security component 202 comprises a measurement module 212, rule module 214 and control module 216. The measurement module 212 is configured to receive, from a device boot process, at least one measurement of a component booted on the device. The measurement module 212 may for example comprise a plurality of measurement registers. The rule module 214 is configured to compare the received measurement to at least one rule that implements the policy, and to enter a policy state on the basis of the comparison. The control module 216 is configured to configure the PUF in accordance with a policy state entered by the rule module.

The rule module 214 may be configured to receive configuration information defining the at least one rule that implements the policy. The configuration information may be a bitstream (for example if the management module 210 is realised in reconfigurable logic) or memory and/or register configurations (for example if the management module 210 is realised in an ASIC). The management module 210 further comprises an authentication module 218 configured to authenticate the configuration information using a security credential.

According to examples of the present disclosure, the policy implemented by the at least one rule comprises a state path and a measurement path by which the at least one state may be reached. The state path comprises at least one state that corresponds to activation of at least one sub function of the PUF and to acceptance of at least one request to generate a PUF response. The measurement path defines an ordered sequence of at least one measurement value of a component that may be booted on the device or of a hardware state of the device. Each state path may comprise more than one state, and each state on the state path may have a specific measurement path by which it may be reached, such that the measurement paths and states are effectively chained together. In some examples, a state path may comprise a state to be entered directly from another state, for example after a threshold number of requests for a PUF response have been received. The policy may comprise a plurality of state paths.

The policy implemented by the at least one rule may further comprise a fallback path defining at least one fallback state. The rule module 214 may be further configured to enter the fallback path if the comparison between received measurement and rule or rules indicates that the received measurement is not compatible with a valid next step along a measurement path in the policy.

Figure 6:
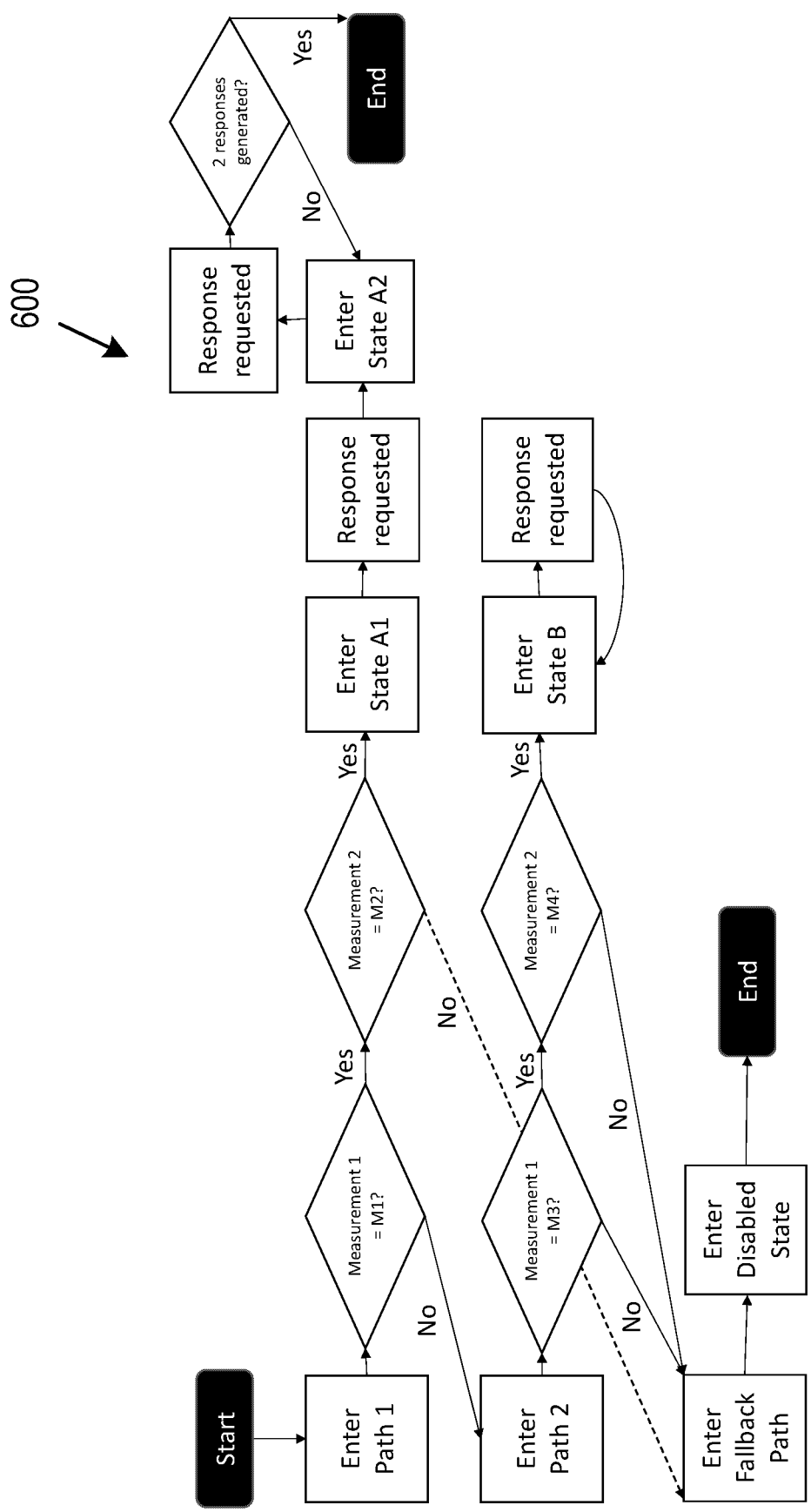
FIG. 6 illustrates an example policy comprising a plurality of state paths.

If no measurement path has yet been started, then a valid next step may be a first step on any measurement path in the policy. If a measurement path has already been started, then an available progression along a measurement path comprises the valid next step on the path that has been started. An example policy, comprising a plurality of state paths, is illustrated in FIG. 6, and discussed in greater detail below.

The rule module 214 may be further configured to identify, on the basis of the comparison, a policy state that can no longer be validly entered, and to cause the identified policy state to become unreachable. A policy state that can no longer be validly entered may be a policy state that cannot be reached via a state path of the policy in light of measurements already received. Causing a policy state to become unreachable means that the PUF behaviour associated with state is no longer accessible, and so is effectively disabled. For example, PUF sub functions associated only with unreachable states may be disabled when the states which use them become unreachable.

The management module 210 may further comprise a plurality of state storage modules 220, and the rule module may cause the identified policy state to become unreachable by writing to the state storage module corresponding to the identified policy state and then preventing any further writing of data to the state storage module of the identified policy state. The state storage modules 220 may for example comprise registers or may comprise other storage solutions.

It may be the case that the response generated by the PUF 250 may not be stable between generations, owing for example to variations in temperature, hardware degradation etc. The response generated to a particular challenge may thus vary over time, such that a response generated to a particular challenge after several generations may contain errors compared with the response generated the first time that challenge was submitted. According to some examples of the present disclosure, the output of the PUF 250 may therefore be subject to error correction to correct for such output variations. In some examples of the security component 202, the management module 210 may further comprise an error correction module 219 that is configured to correct for errors in a response generated by the PUF. The error correction module 219 may comprise one or more error correcting functions, and may be configured to extract and save in the memory 206 of the device 200 helper data 207 from a first generated response to a challenge, and to use the helper data 207 to perform error correction on subsequently generated responses to the challenge. The error correction may correct for errors in the response owing to variations such as temperature variations and/or hardware degradation.

The management module is configured to receive a request for a PUF response, following which the rule module 214 is configured to determine whether a current policy state is compatible with granting the request, and, if the current policy state is compatible with granting the request, instruct the control module 216 to cause the PUF 250 to generate a response based on the current configuration of the PUF 250. The rule module may then increment a count of a number of times a response has been generated by the PUF 250 with the rule module in the current policy state. If the incremented count exceeds a count threshold for the current policy state, the rule module 214 may exit the current policy state. On exiting the current policy state, the rule module 214 may traverse a next step in the state path, which may comprise a measurement value of a next measurement on a measurement path (to be compared with a next received measurement value), another policy state to be entered, a fallback state to be entered etc. Thus, if the incremented count exceeds a count threshold for the current policy state, the rule module may enter at least one of a different policy state, a measurement path by which a different policy state may be reached, the measurement path defining an ordered sequence of at least one measurement value of a component that may be booted on the device, or a fallback path defining at least one fallback state. The fallback state may be associated with a particular configuration of the PUF 250 that generates a response that is to be made available to any users, or may for example be associated with disablement of the PUF 250.

As is discussed in greater detail below with respect to example implementations of the security components 102, 202, the management module may be implemented using at least one of reconfigurable control logic, hard logic blocks and/or at least one software module.

Figure 3:
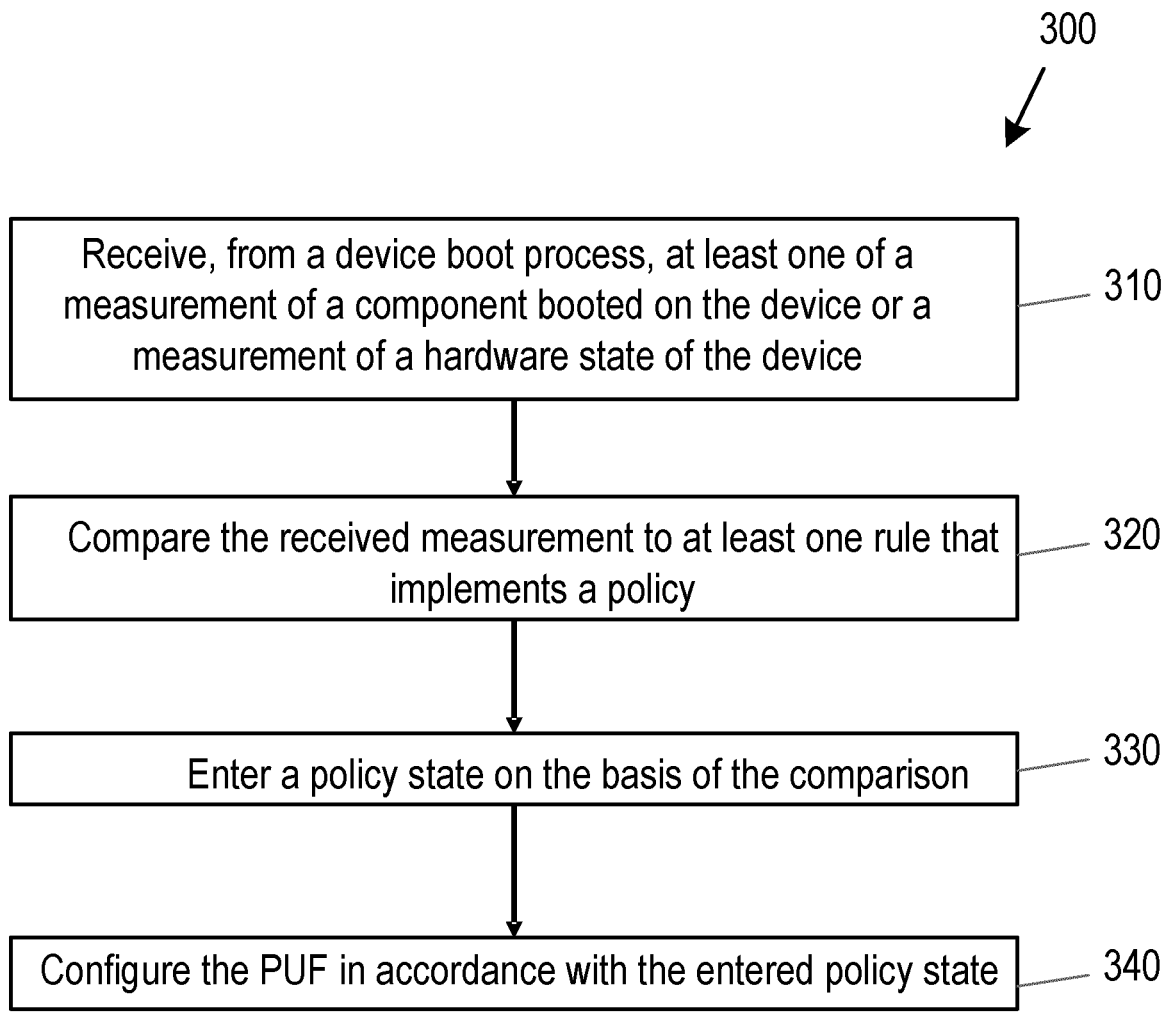
FIG. 3 is a flow chart illustrating a method for operating a security component for a device.

FIG. 3 is a flow chart illustrating a method 300 for operating a security component for a device. The security component comprises a PUF having a plurality of sub functions, and a management module that is configured to manage the PUF in accordance with a policy. The security component may for example comprise a security component 102 or 202 as described above. Referring to FIG. 3, the method comprises, in a first step 310, receiving, from a device boot process, at least one of a measurement of a component booted on the device or a measurement of a hardware state of the device. The method further comprises comparing the received measurement to at least one rule that implements the policy in step 320, and entering a policy state on the basis of the comparison in step 330. The method further comprises configuring the PUF in accordance with a policy entered state in step 340.

Figure 4A:
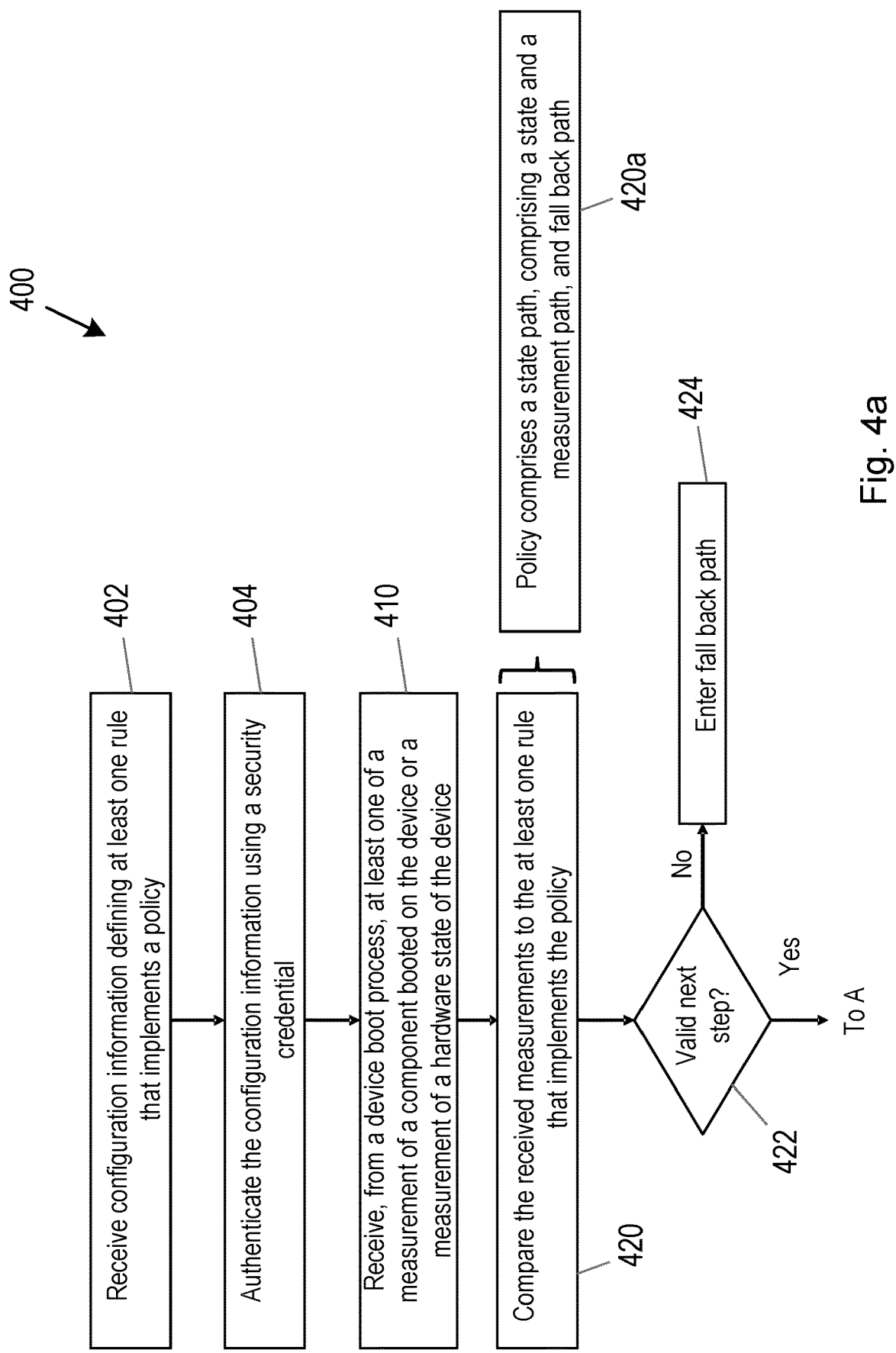
FIGS. 4*a* to 4*c* show a flow chart illustrating another example of method for operating a security component for a device.
Figure 4B:
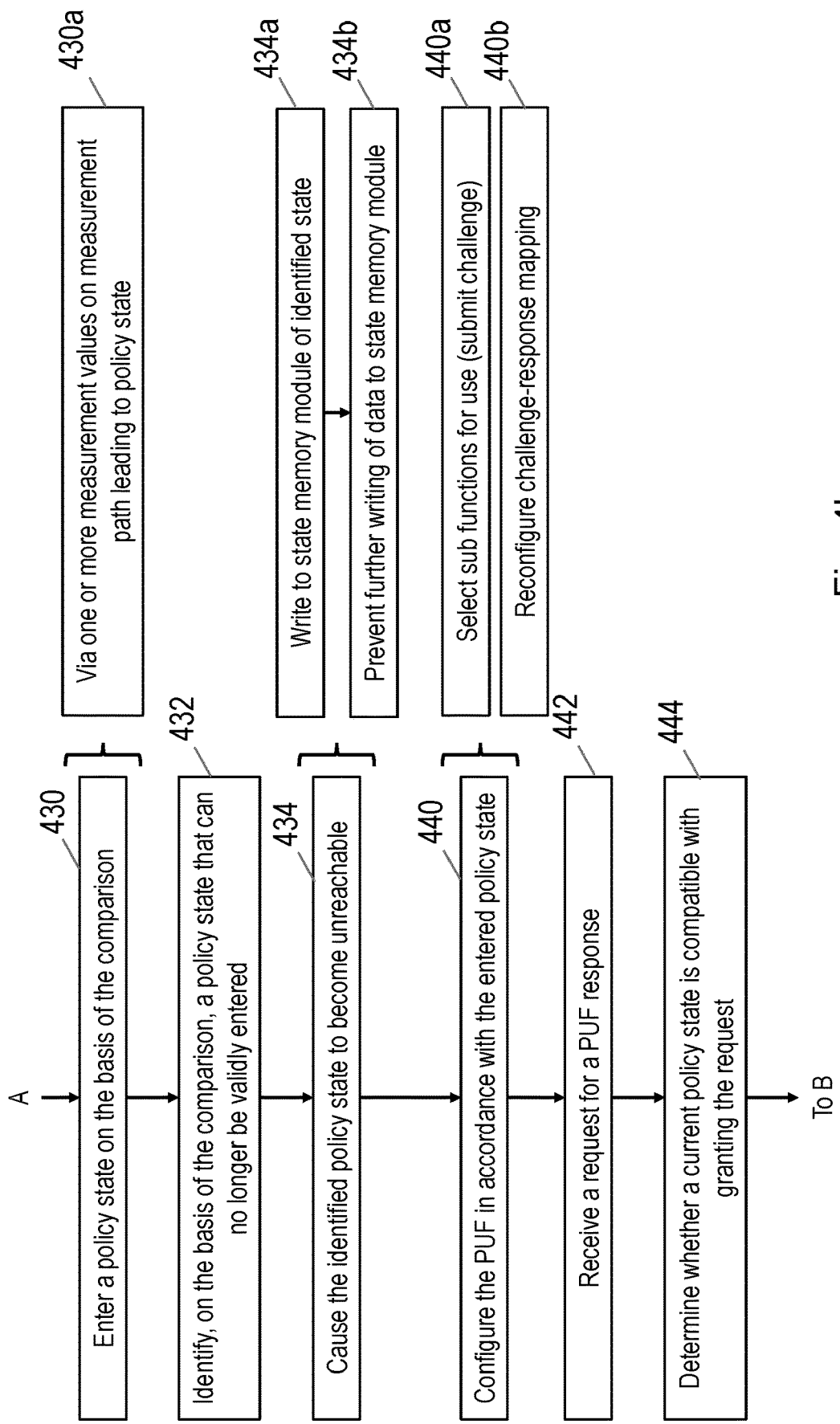
Figure 4C:
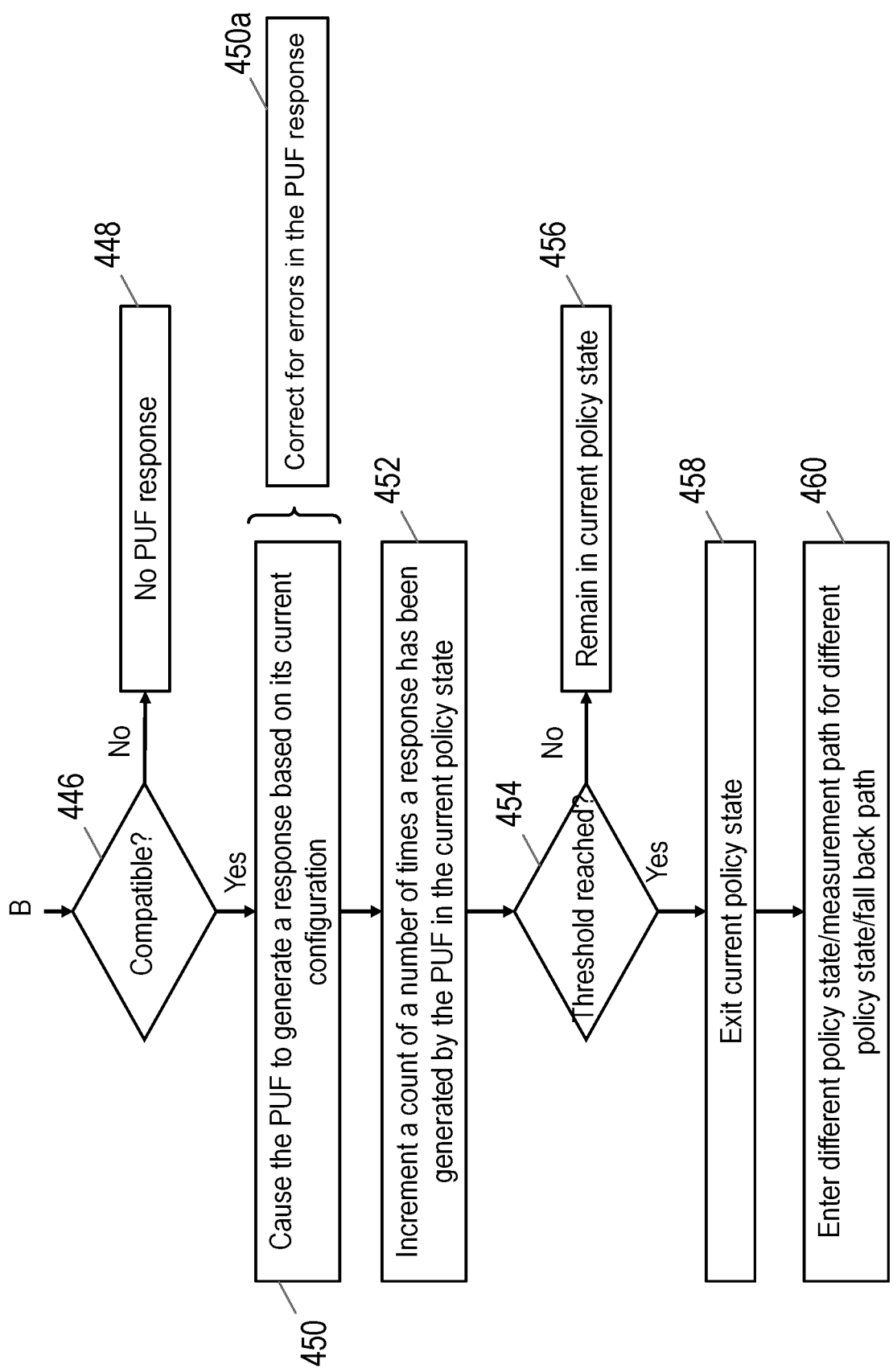

FIGS. 4a to 4c show a flow chart illustrating process steps in another example of method 400 for operating a security component for a device. As for the method 300, the security component comprises a PUF having a plurality of sub functions, and a management module that is configured to manage the PUF in accordance with a policy. The security component may for example comprise a security component 102 or 202 as described above. The method 400 illustrates examples of how the steps of the method 300 may be implemented and supplemented to achieve the above discussed and additional functionality.

Referring initially to FIG. 4a, in a first step 402, the method 400 comprises receiving configuration information defining the at least one rule that implements the policy in accordance with which the PUF is to be managed. The method further comprises authenticating the configuration information using a security credential in step 404. In step 410, the method comprise receiving, from a device boot process, at least one of a measurement of a component booted on the device or a measurement of a hardware state of the device, and the received measurement is compared to at least one rule that implements the policy in step 420. As illustrated in 420a, the policy implemented by the at least one rule comprises a state path having least one state that corresponds to activation of at least one sub function of the PUF and to acceptance of at least one request to generate a PUF response. The policy further comprises a measurement path by which at least one state of the state path may be reached. The measurement path defines an ordered sequence of at least one measurement value of a component that may be booted on the device or of a hardware state of the device. Also as illustrated in 420a, the policy implemented by the at least one rule may further comprise a fallback path defining at least one fallback state.

In step 422, the method comprises determining if the comparison between received measurement and rule indicates that the received measurement is compatible with a valid next step on a measurement path in the policy. If no measurement path has yet been started, then a valid next step may be a first step on any measurement path in the policy. If a measurement path has already been started, then a valid next step comprises the next step on the path that has been started. If the comparison indicates that the received measurement is not compatible with a valid next step on a measurement path in the policy (No at step 422), then the method comprises entering a fallback path at step 424. Referring now to FIG. 4b, if the comparison indicates that the received measurement is compatible with a valid next step on a measurement path in the policy (Yes at step 422), then the method comprises entering a policy state on the basis of the comparison. As illustrated in step 430a, the policy state may be entered via one or more additional received measurement values on the measurement path leading to the policy state, for example, if the measurement value received at step 410 did not lead directly to a policy state but to another measurement value on the current measurement path.

In step 432, the method comprises identifying, on the basis of the comparison in step 420, a policy state that can no longer be validly entered. This may comprise a state that cannot now be reached via any measurement path in the policy, in light of the already received measurement or measurements. In step 434, the method comprises causing the identified policy state to become unreachable. As illustrated at 434a and 434b, causing the identified policy state to become unreachable may comprise writing to a state storage module (such as a state register) corresponding to the identified policy state, and preventing any further writing of data to the state storage module of the identified policy state.

In step 440, the method comprises configuring the PUF in accordance with the policy state entered in step 430. As illustrated at 440a and 440b, this may comprise selecting which sub functions to use, for example by submitting a challenge to the PUF, or remapping challenge-response mappings using a Logically Reconfigurable PUF (LR-PUF).

In step 442, the method comprises receiving a request for a PUF response. The method then comprises, in step 444, determining whether a current policy state is compatible with granting the request. Referring now to FIG. 4c, if at step 446 the current policy state is not compatible with granting the request, a PUF response is not generated at step 448. If the current policy state is compatible with granting the request, the method comprises causing the PUF to generate a response based on its current configuration in step 450. As illustrated at 450a, causing the PUF to generate a response based on its current configuration may further comprise correcting for errors in the PUF response, for example by submitting the PUF response to an error correction module. Correcting for errors in the PUF response may comprise extracting and saving, for example in a memory of the device, helper data from a first generated response to a challenge, and may comprise using the helper data to perform error correction on subsequently generated responses to the challenge. The helper data may comprise one or more error correcting codes. If a PUF response is generated, at step 452 the method comprises incrementing a count of a number of times a response has been generated by the PUF in the current policy state. At step 454, the method comprises determining whether or not a count threshold has been reached or exceeded. If a threshold has not been reached or exceeded, the management module remains in the current policy state at step 456. The method may then comprise returning to step 442, if a further request for a PUF response is received, or to step 410, if a further measurement value is received.

If the incremented count has reached or exceeded a count threshold for the current policy state, the method comprises exiting the current policy state at step 460. The method may then comprise entering at least one of a different policy state, a measurement path by which a different policy state may be reached, or a fallback path defining at least one fallback state.

The methods 300, 400 may be implemented via a computer program stored on the device, and the present disclosure provides a computer program product comprising a computer readable medium, the computer readable medium having computer readable code embodied therein, the computer readable code being configured such that, on execution by a suitable computer or processor, the computer or processor is caused to perform a method according to any of the examples described herein.

There now follows a discussion of different implementations of a security component according to the present disclosure.

In one example, a security component may be implemented on a device having configurable units that will receive configuration after power-on but prior to device boot. Examples of such components include processors, memory, programmable logic etc. In another example, a security component may be implemented in an Application Specific Integrated Circuit (ASIC) in which the behaviour of the hardware is configurable via memory and registers.

Figure 5:
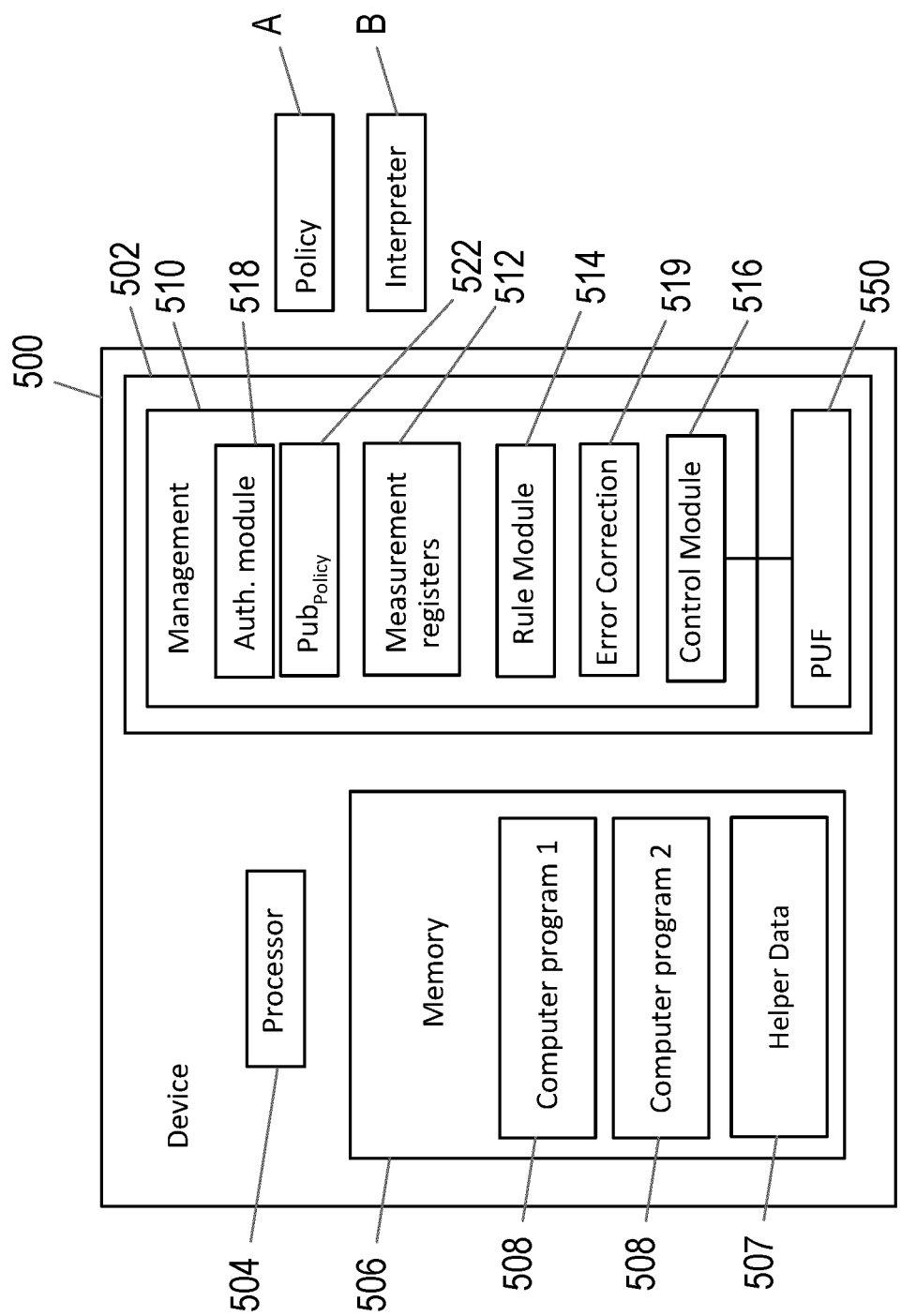
FIG. 5 illustrates an example implementation of a security component.

FIG. 5 illustrates an example implementation of a security component 502 for a device 500. The device 500 on which the security component is installed comprises a processor 504 and memory 506, on which one or more computer programs 508 may be stored. Items of "Helper Data" 207, including for example error correcting codes, may also be stored in the memory 206, according to different examples of the present disclosure. The device 500 may additionally comprise one or more telecommunications interfaces, for wired or wireless communication. Consistent with the security components 102, 202, the security component 502 comprises a PUF 550 of electronic measurement type, relying on implicit randomness, and having several sub functions. The security component 502 also comprises a management module 510. FIG. 5 also illustrates a policy A to be implemented by the management module 510, which policy defines how different measurements should activate, reconfigure or disable the PUF 550. FIG. 5 also illustrates a rule interpreter B, which interprets the policy and generates configuration information (such as code or bitstreams) for the rule module and control module of the management module 510.

The management module 510 comprises:
A public key, Pub_policy, 522
An asymmetric crypto module, labelled authentication module 518, for verifying a signature on bitstreams or other configuration information for the rule module and control module
Several measurement registers 512, for writing of boot measurements
A rule module 514, for evaluating incoming measurements with respect to a policy to be implemented policy
A control module, for determining the behaviour of the PUF 550
An error correction module 519, for correcting errors generated by the PUF 550

The PUF 550 can be of any subtype using either implicit or explicit randomness. Thus PUF 550 could be implementable using electronic circuits and could use unpredictable manufacturing differences as source of randomness. The PUF 550 could also be implemented using explicit randomness. In this type of PUF, the challenge and response could be submitted using for example optics, radio frequencies or magnetism. In these cases, the challenge and response could be translated from and to electric signals when interacting with the PUF 550.

In an example of the security component 502 formed from configurable logic units, the rule module 514 and control module 516 may be implemented in reconfigurable logic. The PUF 550 can be implemented in reconfigurable logic or may be a hard logic block. The crypto module 518 can be implemented in a hard logic block, reconfigurable logic or software. The rule interpreter A is an external component and can be implemented in external software or hardware.

The input and activation signal of the PUF 550 is connected to the management module 510, or more specifically to the rule module 514. The management module 510 handles all requests from a client to read out the PUF response. If the PUF 550 is of challenge-response type, the client is not allowed to choose the challenge, this capability is restricted to the control module 516.

The policy consists of one or several paths of measurements values leading to states. A path in this context is one or more measurements which must be supplied in the correct order and be an exact match for the values in the policy. Along a path there is at least one state. A state corresponds to a pre-defined configuration of the PUF 550, and to accepting of requests to generate a PUF response. A policy can have a limit for each state, defining how many responses may be generated in each state. Each path may have additional states after an initial state. These are referred to as sub-states and are only reachable by first entering the initial state. The policy also defines one or more fallback paths setting out what should happen if a received measurement does not match any path in the policy. A fallback path may specify that the PUF should generate a specific response or should be turned off.

FIG. 6 illustrates an example policy 600. State A1 is the initial state of a first policy path Path 1, reached by measurements M1 and M2. State A1 has a maximum generation of one response before moving to sub-state A2. Once sub-state A2 is entered, the following generation will output a different PUF response to that output in State A1. As the sub-state A2 is only reachable by first visiting the first level state A1, the response generated in the sub-state A2 can be considered as a derivation of the response in state A1. State B is the initial state of a second policy path Path 2, reached by measurements M3 and M4. Once entered, there is no upper limit to the number of responses that can be generated by the PUF in state B. If a received measurement does not match a valid next step for a path, a fallback path of the policy is entered, causing the PUF to enter a disabled state. If a received measurement is the first received measurement, then a valid next step comprises any first step on a policy path, i.e. measurement M1 or M3. If measurement M1 has already been received, then the only valid next step is measurement M2 on Path 1. If measurement M3 has already been received then the only valid next step is measurement M4 on Path 2.

Referring again to FIG. 5, once a policy A is submitted, the rule interpreter B will parse the policy and translate it to register-transfer level (RTL). The RTL is used to create a bitstream or other configuration information which enforces the rules in the policy. This bitstream is used to program the rule module 514. When the rule interpreter B has generated the bitstream, it uses knowledge of the rule module 514 and the PUF 550 to generate configuration information for the control module. The control module is connected to both the rule module 514 and the PUF 550, and has individual connections to all sets of PUF sub functions, enabling it to disable specific subfunctions, alter the challenge or reconfigure the PUF.

The management module stores a public key, Pub_policy, 522 in an OTP memory or ROM memory. The public key need not be secret, but storing it in OTP/ROM memory ensures integrity, i.e. that once the key is supplied it cannot be changed. The corresponding private key, K_policy can be used to sign the configuration information for the rule module 514 and control module 516. Pub_policy can either be programmed during manufacturing, and thereby owned by the manufacturer, or programmed and owned by the hardware owner, according to particular use cases.

The control module and rule module bitstreams or other configuration information are provided via an external interface. The signature on the information are checked using Pub_policy 522 and the crypto module 518. An update of the control module 516 and/or rule module 514 should be made prior to receiving measurements. The rule module 514 and control module 516 should not be reprogrammed during device operation. It will be appreciated that the security of the security component is not dependent on any component in the management module nor the PUF being secret. All parts of the management module and PUF should however be integrity protected. Just as in the case of a Trusted Platform Module (TPM), the measurements should be written by a trusted boot process.

Figure 7:
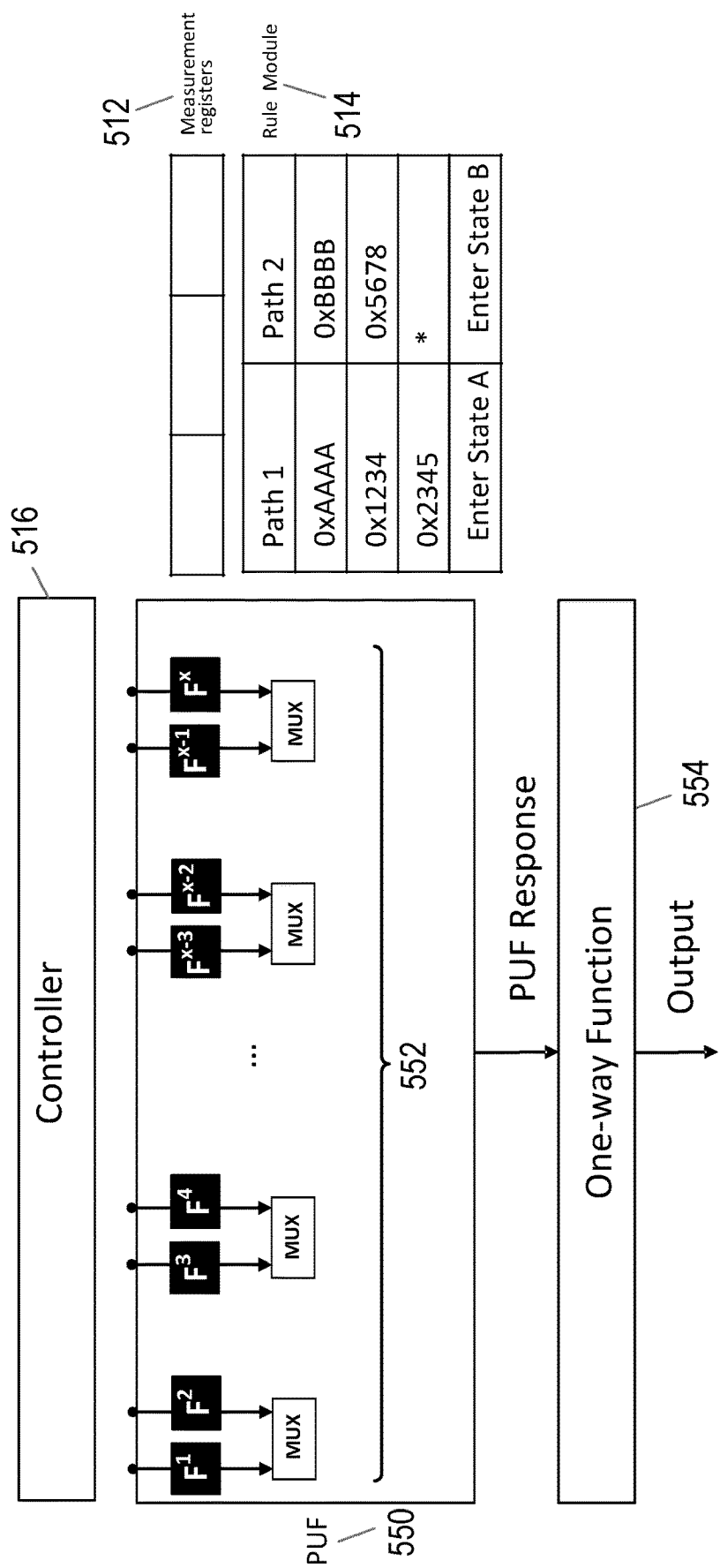
FIGS. 7, 8 and 11 illustrate elements of an example security component in use.

FIG. 7 illustrates a PUF 550, control module 516, measurement registers 512, and rule module 514. The PUF 550 comprises a plurality of sub functions 552. A one way function 554 is configured to provide a one way transformation of the PUF response. The rule module 514 has been configured with rules defining two policy paths, Path 1 leading to State A and Path 2 leading to State B. In FIG. 7, no measurement has been written to the measurement registers 512 and the management module has yet to enter a state, the PUF 550 is not activated.

During boot, the device 500 writes measurements to the measurement registers 512. After each write, the rule module 514 evaluates the measurement. If the first measurement matches a policy path, the rule module 514 moves to next step along the corresponding path, as dictated by the policy. If the next step is another measurement, the rule module 514 awaits another write to the measurement registers 512. If the next step is a state, the rule module 514 instructs the control module 516 to setup the PUF 550 using the configuration belonging to the state.

Figure 8:
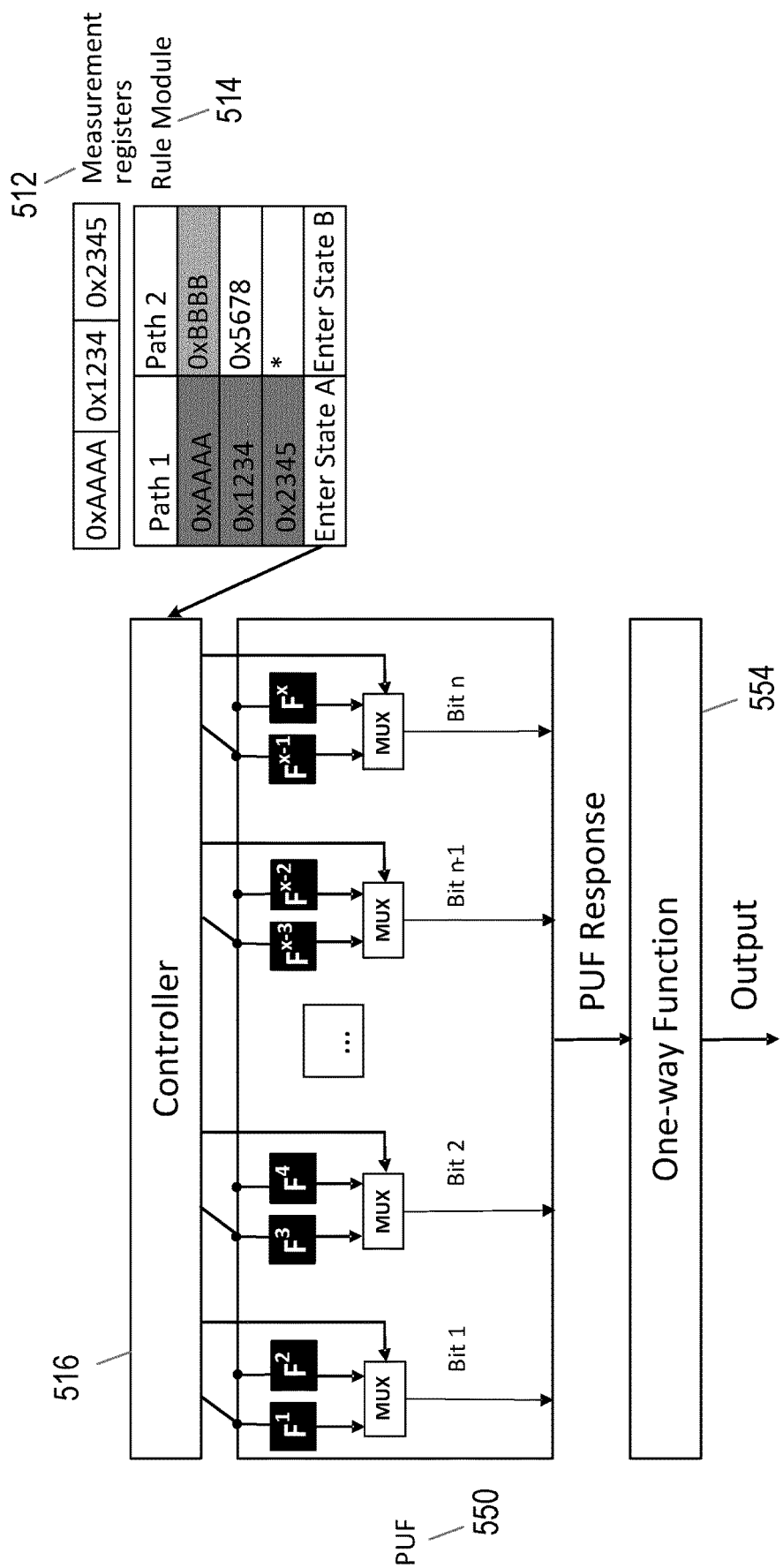

FIG. 8 illustrates the PUF 550, control module 516, measurement registers 512 and rule module 514 of FIG. 7 after receipt of several measurements. The rule module 514 has matched all incoming measurements with Path 1. The rule module has therefore entered state A and instructed the control module to set up the PUF in the configuration corresponding to State A. This state uses the sub functions (F1, F3 . . . Fx-3, Fx-1) to generate n bits. The multiplexers (MUX) illustrated in FIGS. 7 and 8 demonstrate the possibility to use several different sub functions to generate one bit. The bits are provided to the one way function 554, outputting a one way transformed output. It will be appreciated that the PUF sub function connections and the use of multiplexers in FIG. 8, as well as the connections illustrated between the control module and the PUF, are illustrative of an example configuration, and could be designed differently in a practical application.

Each state has a corresponding state register. Once a state has been determined to be unreachable, the rule module 514 writes to this register and turns it into read-only. If the rule module 514 tries to enter a state for which the register has been written, for example owing to hardware error or hardware tampering, the rule module moves into the fallback path. This adds an extra layer of security, enabling the PUF 550 to be made available to any user of the device without risking any responses in non-active states to leak. A state is unreachable if it cannot validly be reached via any policy path. For example, and with reference to the policy illustrated in FIG. 6, once measurement M1 has been received, Path 1 is engaged and it is no longer possible to validly arrive at state B. State B is therefore unreachable after receipt if a first measurement matching M1.

Each state in a policy corresponds to a state setup, comprising at least one of the following: a combination of sub functions in the PUF 550, a challenge-response mapping of the PUF 550, and/or a certain configuration of sub functions in the PUF 550. The state setup is chosen by the rule module 514 and activated by the control module 512. Each state setup is unique.

The PUF response passes through a one way function which removes any correlation between different combinations of sub functions. FIGS. 7 and 8 illustrate an example, using unique combinations of state setups and a one way function.

When the device 500 requests a PUF response to be generated, the rule module 514 evaluates if it is in a state which permits the request to be granted. If the request is allowed, the rule module 514 instructs the control module 516 to activate the PUF and generate a response. The rule module 514 also increases its internal counter indicating number of responses generated in a current state. If the policy has a limit for the number of generated responses in the current state, the rule module 514 will leave its current state once the maximum number of responses have been reached. If a sub-state exists, the management module will enter the new state immediately after generating the response and consequently tell the control module 516 to reprogram the PUF 550.

Each policy path can end in one of two ways:

Last state of path has no limit and the PUF configuration becomes static until reboot, the PUF response of the state is returned for any subsequent request (illustrated in Path 2 of FIG. 6).

Last state of path has a limit (illustrated in Path 1 of FIG. 6). Once this limit is reached, the rule module moves into fallback path. The fallback state may be associated with turning off the PUF or entering a new state, and the PUF may therefore either be disabled or its configuration rendered static until reboot.

Some example realisations of security component may be sensitive to error in the PUF response, caused by for example temperature variations, and some realisations may include an error correction module 519. The error correction module 519 can be configured to produce helper data, such as error correction codes, in an enrolment phase, or take helper data and use it to correct any errors during a challenge phase.

Figure 11:
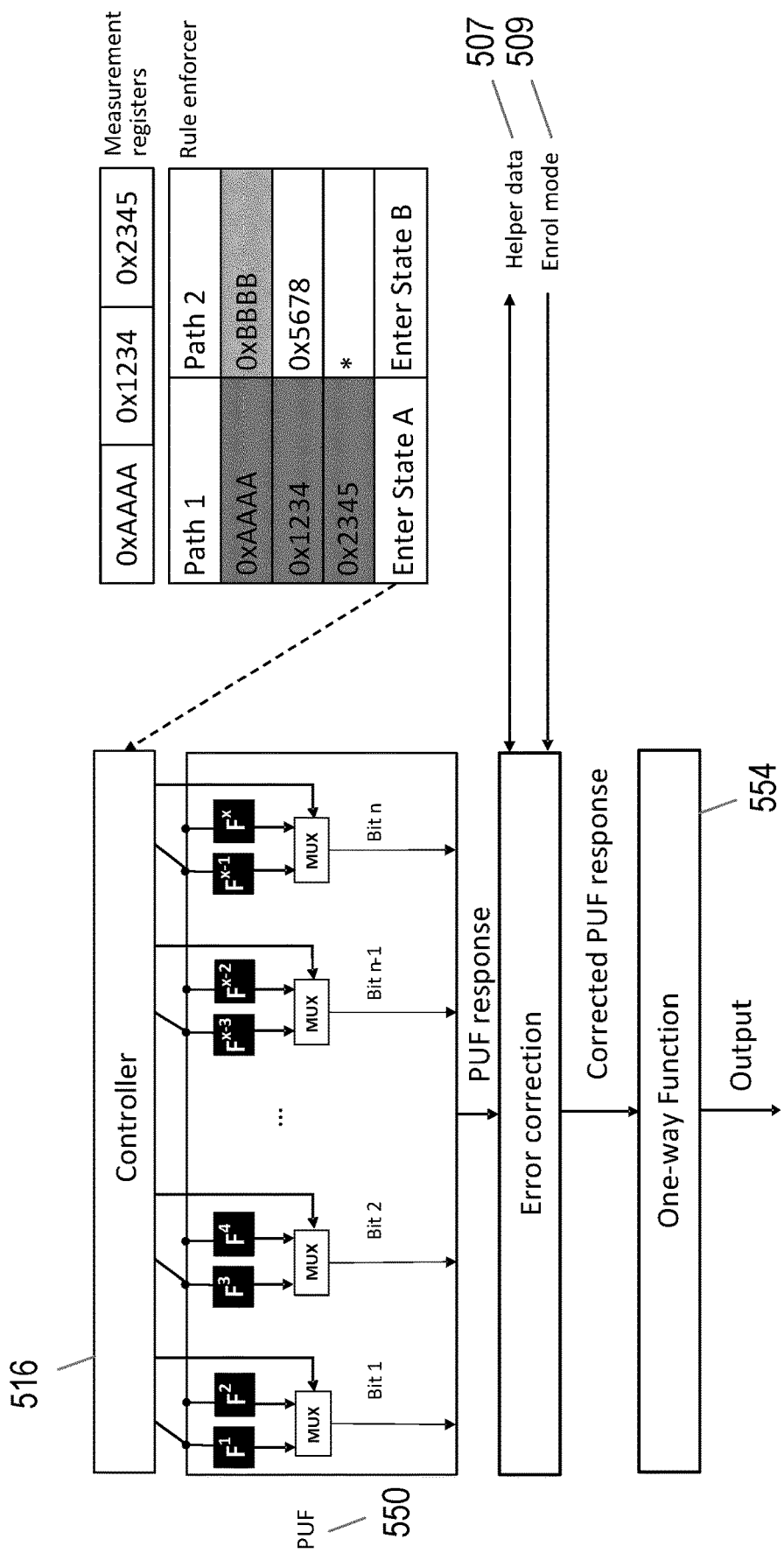

FIG. 11 is similar to FIG. 8, illustrating the PUF 550, control module 516, measurement registers 512, and rule module 514 of FIG. 7, after receipt of several measurements. FIG. 11 also illustrates error correction module 519. The error correction module 519 takes the PUF response as input and outputs a corrected response to the one way function 554. In addition to the PUF input, the error correction module 519 takes two additional inputs, helper data 507 and an enrol mode signal 509. If the enrol mode signal is activated, the error correction module 519 extracts and outputs helper data, such as error correction codes, which can be stored by the module generating the PUF response or by a dedicated helper data component. When the enrol mode signal is activated, no error correction is performed. If the enrol mode signal is deactivated, helper data 507 is input to the error correction module 519 and used to correct errors in the PUF sub function responses.

The error correction module may comprise one or several error correcting functions. The helper data may comprise one or several types of error correction codes, such as BCH codes or Reed-Muller codes. The error correction module may also or alternatively comprise bit selection functions in which unreliable bits in the PUF response are removed. The bit selection functions may operate on the basis of knowledge of the characteristics of a particular PUF, and are therefore not specific to a particular challenge, as is the case with extracted helper data such as error correction codes.

The above discussion of an implementation of a security component is presented in the context of a security component realised in configurable logic blocks. It will be appreciated that in an example in which the security component is realised in an ASIC, all of the functionality described will operate substantially as described above on an ASIC, with the following exceptions:

Management module components are implemented as hard logic blocks.

As the rule module and control module are implemented in hard logic blocks, a bitstream is not applicable to setup these components. Instead the rule interpreter generates memory/register configurations which are signed and used to setup these components.

The possibilities of how the policy can be configured are limited. The policy can only change registers and memories which gives a less flexibility in configuring PUF behaviour.

There now follows a description of various example process flows according to different implementation of the present disclosure.

Figure 9:
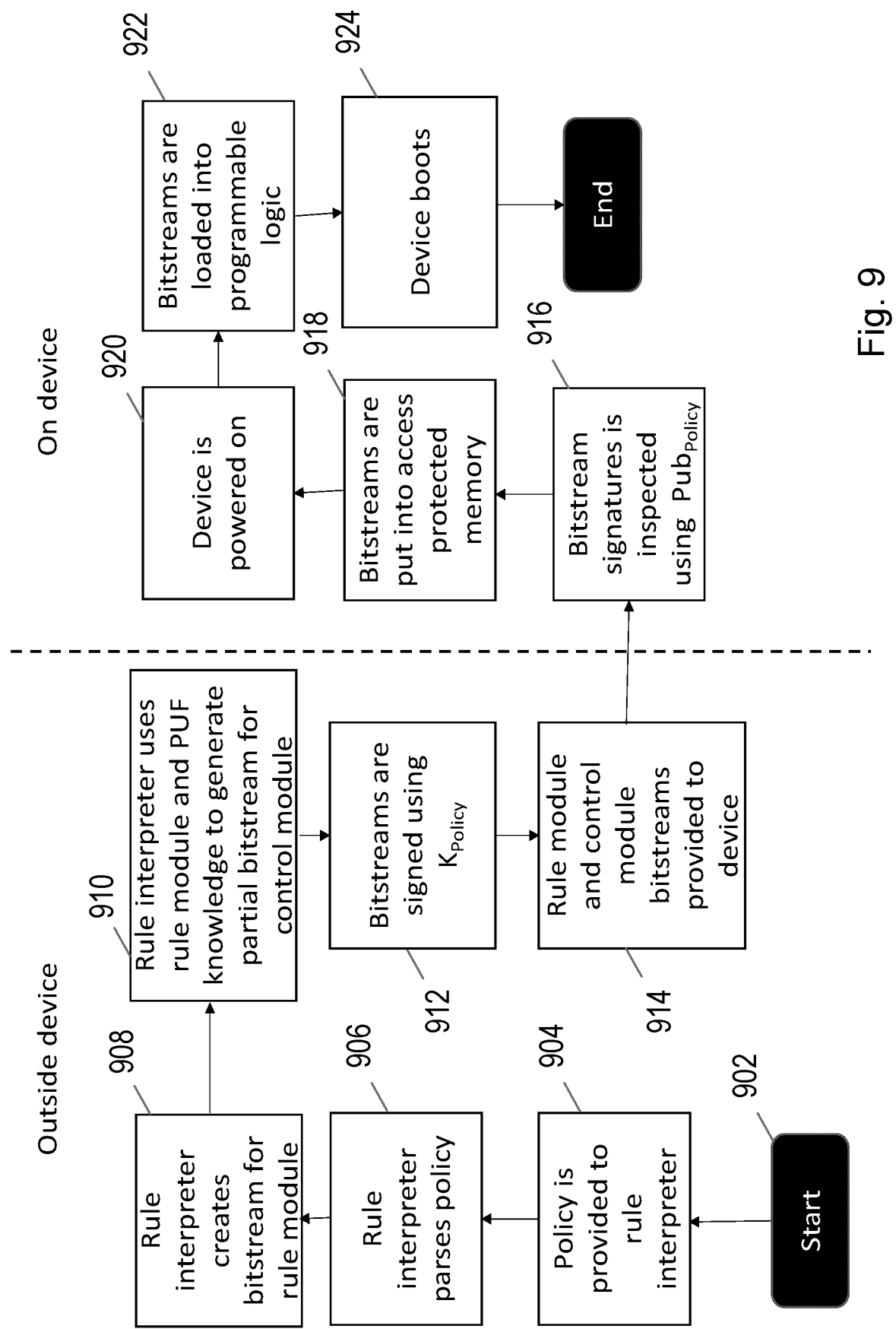
FIG. 9 illustrates an example process flow prior to device boot.

FIG. 9 illustrates process flow prior to device boot.

Outside the device:

The process starts 902

A policy is uploaded to the rule interpreter 904.

The rule interpreter parses the policy 906 and creates RTL corresponding to the policy. The RTL is compiled into a rule module bitstream 908.

The rule interpreter uses the knowledge of the rule module and the PUF to create the RTL for the control module 910. The RTL is compiled into a control module bitstream.

The policy owner signs the bitstreams using K_policy 912 and supplies them to the device 914.

On the device:

The signatures of the bitstreams are inspected by the crypto module using Pub_Policy 916.

The control module and rule module bitstream are stored in access protected on-chip memory 918

The device is powered on 920

Bitstreams are loaded into the programmable logic 922

The device boots 924

Figure 10:
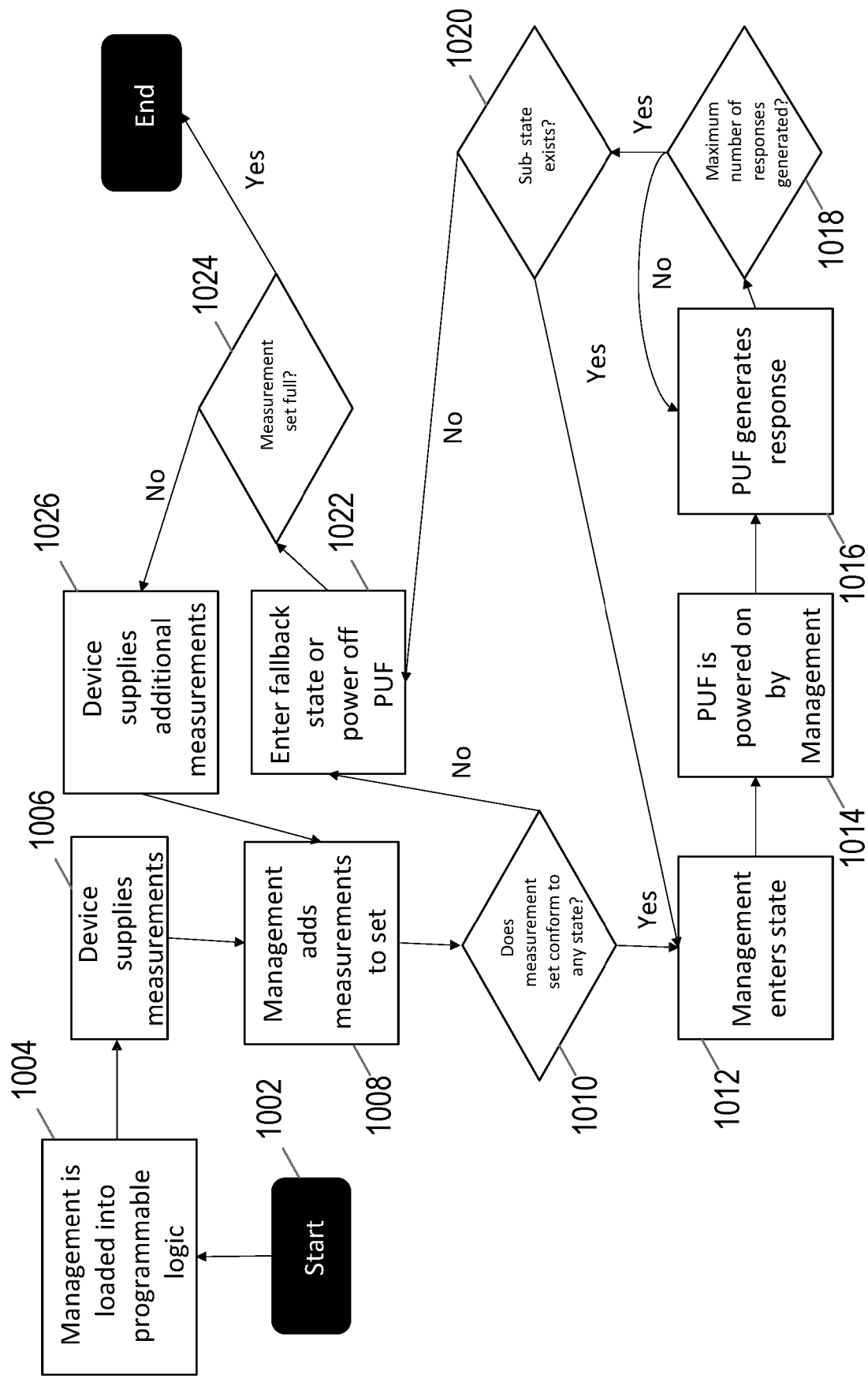
FIGS. 10 and 12 illustrate example process flows following device boot.

FIG. 10 illustrates process flow following powering on of the device in an example in which the security component is realised in configurable units.

The process starts 1002

Management is loaded into programmable logic 1004

The device supplies measurements 1006

The received measurements are added to a measurements set 1008

Check whether the received measurement conforms to a state 1010

If yes, management enters state 1012

If no, enter fallback state or power off 1022, if measurement set is full 1024, end, if measurement set is not full 1024, await additional measurements 1026

Following entering state 1012, PUF is powered on 1014

PUF generates a response 1016

Has the maximum number of responses been generated? 1018

If no, generate new response 1016

If yes, does a sub-state exist? 1020

If yes, enter sub-state

If no, enter fallback state or power off 1022 if measurement set is full 1024, end, if measurement set is not full 1024, await additional measurements 1026

Figure 12:
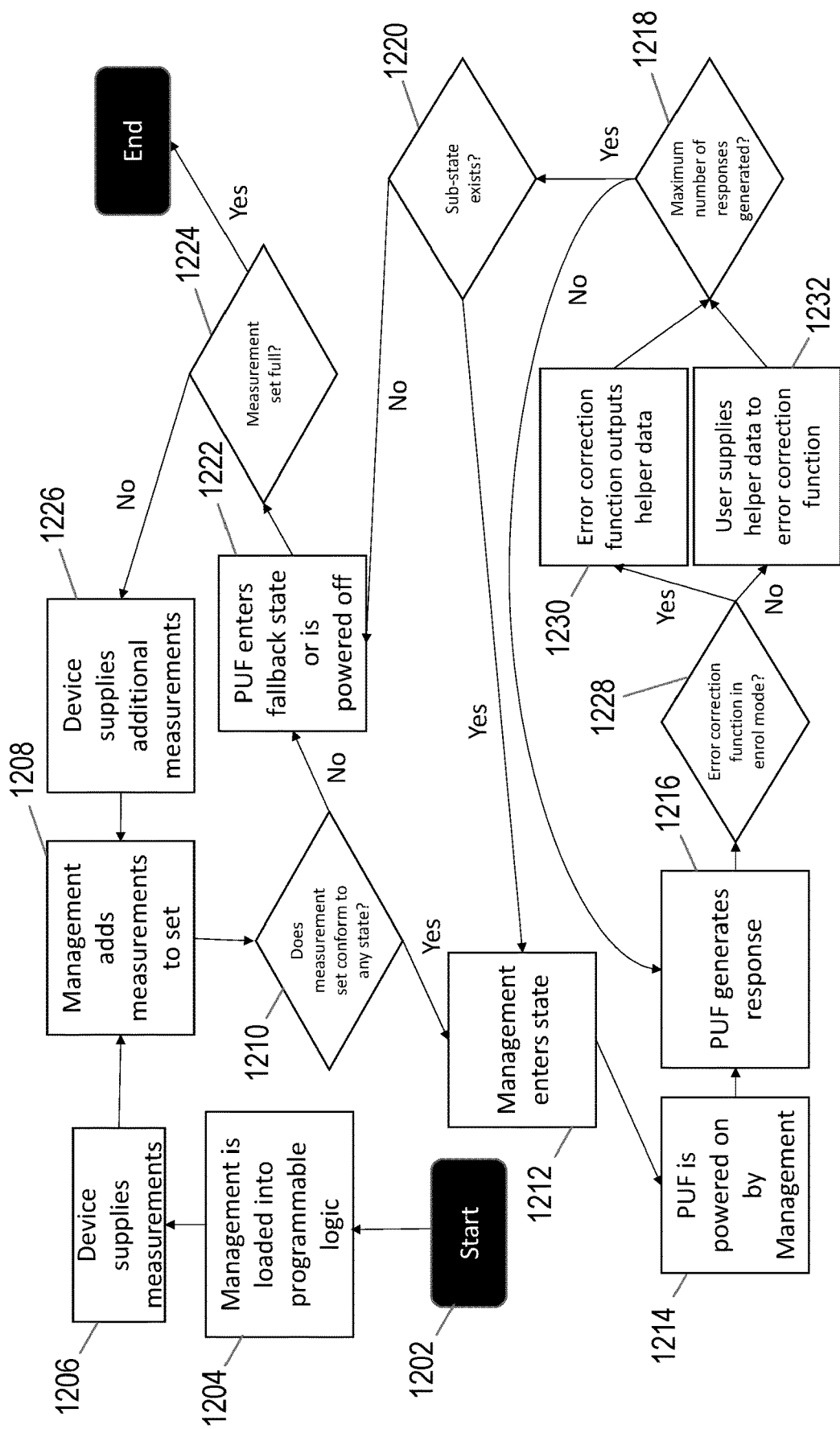

FIG. 12 illustrates another example of process flow following powering on of the device in an example in which the security component is realised in configurable units.

The process starts 1202

Management is loaded into programmable logic 1204

The device supplies measurements 1206

The received measurements are added to a measurements set 1208

Check whether the received measurement conforms to a state 1210

If yes, management enters state 1212

If no, enter fallback state or power off 1222, if measurement set is full 1224, end, if measurement set is not full 1224, await additional measurements 1226

Following entering state 1212, PUF is powered on 1214

PUF generates a response 1216
Is error correction module in enrol mode? 1228
If yes, error correction module outputs helper data 1230
If no, error correction module takes helper data as input and performs error correction on PUF response 1232
Has the maximum number of responses been generated? 1218
If no, generate new response 1216
If yes, does a sub-state exist? 1220
If yes, enter sub-state
If no, enter fallback state or power off 1222 if measurement set is full 1224, end, if measurement set is not full 1224, await additional measurements 1226

The following use case scenarios illustrate application of the above discussed process flow using the policy illustrated in FIG. 6

Scenario 1
The device is powered on.
The rule module and control module are loaded/configured.
The device commences boot sequence.
When the first boot component has loaded, a hash function of the component is performed and the result, M3, is written to measurement registers.
M3 is compared to the allowed values in the first step of each path. Path 2 is found to be a match for M3. This disables path 1, all registers belonging to unreachable states are written and write protected afterwards.
When the second boot component has loaded, a hash function of the component is performed and the result, M4, is written to the measurement registers.
M4 is compared to the allowed values along the current path. M4 is a match to the second value of path 2.
The device sends a request for a PUF response.
The rule module receives the request and instructs the control module to generate a PUF response which can be read by the device.
This is the end state for this path, there is no limit on number of responses. The PUF will continue to generate the state B response until device is rebooted.

Scenario 2
The device is powered on.
The rule module and control module are loaded/configured.
The device commences boot sequence.
When the first boot component has loaded, a hash function of the component is performed and the result, M1, is written to measurement registers.
M1 is compared to the allowed values in the first step of each path. Path 1 is found to be a match for M1. This disables path 2, all registers belonging to unreachable states are written to and write protected afterwards.
When the second boot component has loaded, a hash function of the component is performed and the result, M2, is written to the measurement registers.
The measurement is compared to the allowed values along the current path. M2 is a match to the second value of path 1.
The rule module moves into state A1 and instructs the control module to configure the PUF in the state corresponding to A1.
The control module configures the PUF as defined for state A1 and awaits a request from the device.
The device sends a request for a PUF response.
The rule module receives the request and instructs the control module to generate a PUF response which can be read by the device.
The rule module leaves state A1, as only one response can be generated in this state. The rule module enters state A2 and instructs the control module to configure PUF in the state corresponding to A2.
The device sends an additional request for a PUF response.
The rule module receives the request and instructs the control module to generate a PUF response which can be read by the device.
When two requests have been served, the rule module leaves state A2. There are no more states along this path. The PUF is powered off and no more responses will be provided until device is rebooted.

Scenario 3
The device is powered on.
The rule module and control module are loaded/configured.
The device commences boot sequence.
When the first boot component has loaded, a hash function of the component is performed and the result, M5, is written to measurement registers.
The measurement is compared to the allowed values in the first step of each path. No match is found so fallback state is entered, disabling paths 1 and 2. All registers are written and write protected afterwards so only the fallback state is allowed.
The fallback state is defined as "disabling the PUF". The management module sends instructions to the control module to disable the PUF.
The control module has not yet activated the PUF as no state was entered, no action is needed.

Aspects of the present disclosure thus provide a security component comprising a PUF, which component is effectively "aware" of the environment in which it is operating. That is, the security component is operable to modify its behaviour according to components booted on its device and a policy. Aspects of the present disclosure enable deterministic creation of different responses using a single PUF. This affords the possibility to create cryptographic keys which are not only device unique but also unique for the environment in which the device operates. In this manner, a key that should, for example, only be available to the manufacturer may be "hidden" from other users without having to access protect the PUF. Additionally, users having different privileges may be allowed to access different device unique keys when accessing the PUF.

Given a device which can be booted in different modes, i.e. loading different components such as software and bitstreams during boot, measurements from the boot sequence may be used to determine the setup of the device. Examples of the present disclosure match such measurements to a policy in order to choose a configuration for the PUF. This ensures that the device may only generate a particular PUF response given certain measurements; loading unauthorised components will, if dictated by the policy, cause the PUF to be deactivated and not expose any response.

If a policy defines multiple allowed combinations of boot components, each combination, including the order in which the components are booted, can trigger the PUF to behave differently. It is also possible to establish a policy that causes different measurement combinations to result in the same PUF response. For example, several different boot component combinations may all result in the same PUF configuration while a certain combination of components, indicating a privileged boot mode, generates a different PUF configuration.

Each state defined by the policy may be limited in the number of times it can be used to generate a response, so that for example a policy may be configured to ensure that a certain response is only available for a single generation, after which it cannot be accessed until the device reboots. This affords the possibility of the first boot component receiving a PUF response which cannot be recreated for any subsequent component. When leaving a particular first state, it is possible to configure the policy such that one or several sub-states are entered, these sub-states only reachable by first entering the first state. This enables the creation of "sub-responses" which can only be generated after the response belonging to the first state has been generated by a previous PUF configuration. This may be advantageous if the response is used for cryptographic purposes, as it removes the need for an external key derivation function (KDF).

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality and a single processor or other unit may fulfil the functions of several units recited in the claims. Any reference signs in the claims shall not be construed so as to limit their scope.

The invention claimed is:

1. A security component for a device, the security component comprising:
   a Physically Unclonable Function (PUF) having a plurality of sub functions; and
   management circuitry configured to manage the PUF in accordance with a policy, wherein the management circuitry is configured to:
      receive, from a device boot process, at least one of a measurement of a component on the device or a measurement of a hardware state of the device;
      compare the at least one received measurement to at least one rule that implements the policy, and to enter a policy state on the basis of the comparison; and
      configure the PUF in accordance with the policy state entered.

2. A security component as claimed in claim 1, wherein the management circuitry is configured to receive configuration information defining the at least one rule that implements the policy.

3. A security component as claimed in claim 2, wherein the management circuitry is further configured to:
   authenticate the configuration information using a security credential.

4. A security component as claimed in claim 1, wherein the policy implemented by the at least one rule comprises a state path, and wherein the state path comprises:
   at least one state that corresponds to activation of at least one sub function of the PUF and to acceptance of at least one request to generate a PUF response; and
   a measurement path by which the at least one state may be reached, the measurement path defining an ordered sequence of at least one measurement value of a component that may be booted on the device or a hardware state of the device.

5. A security component as claimed in claim 4, wherein the policy implemented by the at least one rule further comprises a fallback path defining at least one fallback state; and wherein the management circuitry is further configured to enter the fallback path if the comparison indicates that the at least one received measurement is not compatible with a valid next step along a measurement path in the policy.

6. A security component as claimed in claim 1, wherein the management circuitry is further configured to
   identify, on the basis of the comparison, a policy state that can no longer be validly entered; and
   cause the identified policy state to become unreachable.

7. A security component as claimed in claim 6, wherein the management circuitry further comprises a plurality of state registers, and wherein the management circuitry is configured to cause the identified policy state to become unreachable by:
   writing to the state register corresponding to the identified policy state; and
   preventing any further writing of data to the state register of the identified policy state.

8. A security component as claimed in claim 1, wherein the management circuitry is configured to receive a request for a PUF response; and wherein the management circuitry is further configured to:
   determine whether a current policy state is compatible with granting the request; and
   if the current policy state is compatible with granting the request, control the PUF to generate a response based on the current configuration of the PUF.

9. A security component as claimed in claim 8, wherein the management circuitry is further configured to, after controlling the PUF to generate a response based on its current configuration:
   increment a count of a number of times a response has been generated by the PUF in the current policy state.

10. A security component as claimed in claim 9, wherein the management circuitry is further configured to:
    if the incremented count exceeds a count threshold for the current policy state, exit the current policy state.

11. A security component as claimed in claim 9, wherein the management circuitry is further configured, if the incremented count exceeds a count threshold for the current policy state, to enter at least one of:
    a different policy state;
    a measurement path by which a different policy state may be reached, the measurement path defining an ordered sequence of at least one measurement value of a component that may be booted on the device or a hardware state of the device; or
    a fallback path defining at least one fallback state.

12. A security component as claimed in claim 1, wherein the management circuitry is implemented using at least one of:
    reconfigurable control logic; and
    hard logic blocks.

13. The security component of claim 1, wherein the security component is configured to be installed in the device, wherein the at least one received measurement is a function of:
  which one or more components are booted on the device by the device boot process; and/or
  an order in which one or more components are booted on the device by the device boot process; and/or
  a hardware state of the device upon boot up of the device by the device boot process.

14. The security component of claim 13, wherein the policy is to configure the PUF to not expose any PUF response if the at least one received measurement indicates that:
  an unauthorized component on the device was loaded during the device boot process;
  one or more components on the device were loaded during the device boot process in an unauthorized order; and/or
  the device is in an unauthorized hardware state upon boot up of the device.

15. The security component of claim 13, wherein the policy is to configure the PUF to generate certain PUF responses only when, according to the at least one received measurement, one or more specific configurations of components have been booted on the device.

16. A method for operating a security component for a device, the security component comprising a Physically Unclonable Function (PUF) having a plurality of sub functions, and management circuitry that is configured to manage the PUF in accordance with a policy, the method comprising:
  receiving, from a device boot process, at least one of a measurement of a component on the device or a measurement of a hardware state of the device;
  comparing the at least one received measurement to at least one rule that implements the policy;
  entering a policy state on the basis of the comparison; and
  configuring the PUF in accordance with the entered policy state.

17. A method as claimed in claim 16, further comprising:
  receiving configuration information defining the at least one rule that implements the policy.

18. A method as claimed in claim 17, further comprising authenticating the configuration information using a security credential.

19. A method as claimed in claim 16, wherein the policy implemented by the at least one rule comprises a state path, and wherein the state path comprises:
  at least one state that corresponds to activation of at least one sub function of the PUF and to acceptance of at least one request to generate a PUF response; and
  a measurement path by which the at least one state may be reached, the measurement path defining an ordered sequence of at least one measurement value of a component that may be booted on the device or a hardware state of the device.

20. A method as claimed in claim 19, wherein the policy implemented by the at least one rule further comprises a fallback path defining at least one fallback state; and
  wherein the method further comprises entering the fallback path if the comparison indicates that the at least one received measurement is not compatible with a valid next step on a measurement path in the policy.

21. A method as claimed in claim 16, further comprising:
  identifying, on the basis of the comparison, a policy state that can no longer be validly entered; and
  causing the identified policy state to become unreachable.

22. A method as claimed in claim 21, wherein the management module comprises a plurality of state registers, and wherein causing the identified policy state to become unreachable comprises:
  writing to the state register corresponding to the identified policy state; and
  preventing any further writing of data to the state register of the identified policy state.

23. A method as claimed in claim 16, further comprising:
  receiving a request for a PUF response;
  determining whether a current policy state is compatible with granting the request; and
  if the current policy state is compatible with granting the request, causing the PUF to generate a response based on its current configuration.

24. A method as claimed in claim 23, further comprising, after causing the PUF to generate a response based on its current configuration:
  incrementing a count of a number of times a response has been generated by the PUF in the current policy state.

25. A method as claimed in claim 24, further comprising:
  if the incremented count exceeds a count threshold for the current policy state, exiting the current policy state.

26. A method as claimed in claim 24, further comprising, if the incremented count exceeds a count threshold for the current policy state, entering at least one of:
  a different policy state;
  a measurement path by which a different policy state may be reached, the measurement path defining an ordered sequence of at least one measurement value of a component that may be booted on the device or a hardware state of the device; or
  a fallback path defining at least one fallback state.

* * * * *